United States Patent
Zhu et al.

(10) Patent No.: US 7,764,808 B2
(45) Date of Patent: Jul. 27, 2010

(54) SYSTEM AND METHOD FOR VEHICLE DETECTION AND TRACKING

(75) Inventors: Ying Zhu, Plainsboro, NJ (US); Dorin Comaniciu, Princeton Jct., NJ (US); Martin Pellkofer, Pentling (DE); Thorsten Köhler, Deuerling (DE)

(73) Assignees: Siemens Corporation, Iselin, NJ (US); Siemens Aktiengesellschaft, Munich (DE)

( * ) Notice: Subject to any disclaimer, the term of this patent is extended or adjusted under 35 U.S.C. 154(b) by 1046 days.

(21) Appl. No.: 10/805,946

(22) Filed: Mar. 22, 2004

(65) Prior Publication Data
US 2004/0234136 A1 Nov. 25, 2004

Related U.S. Application Data

(60) Provisional application No. 60/457,056, filed on Mar. 24, 2003, provisional application No. 60/490,332, filed on Jul. 25, 2003.

(51) Int. Cl.
*G06K 9/00* (2006.01)
(52) U.S. Cl. .................................. 382/104; 382/103
(58) Field of Classification Search ................ 382/104, 382/103
See application file for complete search history.

(56) References Cited

U.S. PATENT DOCUMENTS

| | | | |
|---|---|---|---|
| 5,761,326 A * | 6/1998 | Brady et al. | 382/103 |
| 6,035,067 A | 3/2000 | Ponticos | 382/226 |
| 6,295,367 B1 | 9/2001 | Crabtree et al. | 382/103 |
| 2007/0154067 A1 * | 7/2007 | Laumeyer et al. | 382/103 |

OTHER PUBLICATIONS

Bruno Abreu, Video-Based Multi-Agent Traffic Surveillance System, Oct. 3-5, 2000; Proceedings of IEEE Intelligent Vehicels symposium 2000.*
Abreu et al., "Video-based multi-agent traffic surveillance system", Intelligent Vehicles Symposium, 2000, Proceedings of the IEEE Dearborn, MI, Oct. 3-5, 2000, pp. 457-462.
Javed et al, "Tracking and object classification for automated surveillance", Computer Vision—ECCV 2002, 7th European Conference on Computer Vision, Proceedings Part IV (Lecture notes in Computer Science vol. 2353), Springer-Verlag Berlin, Germany, 2002, pp. 343-357.
Wang et al., "Development of gazing algorithms for tracking oriented recognition", Proceedings of the SPIE—The Int'l Society for Optical Engineering, vol. 3069, 1997, pp. 37-48.
Rajagopalan et al., "Vehicle detection and tracking in video", Proceedings of the IEEE, New York, vol. 1, Sep. 10, 2000, pp. 351-354.

(Continued)

*Primary Examiner*—Vu Le
*Assistant Examiner*—Claire Wang

(57) ABSTRACT

A system and method for detecting and tracking an object is disclosed. A camera captures a video sequence comprised of a plurality of image frames. A processor receives the video sequence and analyzes each image frame to determine if an object is detected. The processor applies one or more classifiers to an object in each image frame and computes a confidence score based on the application of the one or more classifiers to the object. A database stores the one or more classifiers and vehicle training samples. A display displays the video sequence.

93 Claims, 7 Drawing Sheets

OTHER PUBLICATIONS

Kung et al., "Neural Networks for Intelligent Multimedia Processing", Proceedings of the IEEE, New York, vol. 86, No. 6, Jun. 1998, pp. 1244-1271.

Fang et al., "A system to detect complex motion of nearby vehicles on freeways", Proceedings of the 2003 IEEE Int'l Conf. on Intelligent Transportation Systems, Oct. 12-15, 2003, Shanghai China, vol. 2, pp. 1122-1127.

"Towards Active Machine-Vision Based Driver Assistance for Urban Areas", F. Heimes, Int. J. Computer Vision, 50(1):5-34, 2002.

"Obstacle Detection by Evaluation of Optical Flow Fields from Image Sequences", W. Enkelmann, Image and Vision Computing, 9(3):160-168, 1990.

"Real-Time Estimation and Tracking of Optical Flow Vectors for Obstacle Detection", Kruger et al., IVS'95, 304-309, 1995.

"Robust Obstacle Detection and Tracking by Motion Analysis", Willersinn et al., 1998.

Moving object Recognition and Classification Based on Recursive Shape Parameter Estimation, D. Koller.

"Real-time Vehicle Detection and Tracing from a Moving Vehicle", Betke et al., Machine Vision and Applications, 12: 69-83, 2000.

"Object Detection Using Model Based Prediction and Motion Parallax", Carlsson et al.

"Model-Based Object Tracking in Monocular Image Sequences of Road Traffic Scenes", Koller et al., Int. J. Computer Vision, 10(3): 257-281, 1993.

"Combination of Edge Elements and Optical Flow Estimates for 3D-Model-Based Vehicle Tracking in Traffic Image Sequences", Haag et al., Int. J. Computer Vision, 35(3) 295-319, 1999.

"Multiple Vehicle Detection and Tracking in Hard Real Time", Betke et al., Technical Report CS-TR-3667, Computer Vision Laboratory, University of Maryland, 1996.

"Robust Car Tracking Using Kalman Filtering and Bayesian Templates", Dellaert et al, ITS'97.

"Overtaking Vehicle Detection Using Implicit Optical Flow", Batavia et al.

"Tracking Cars in Range Images Using the Condensation Algorithm", Meier et al.

"A Component-Based System for Car Detection" Thompson et al.

"Example-Based Object Detection in Images by Components", Mohan et al., IEEE Trans. PAMI, 23(4): 349-361, 2001.

"Rapid Object Detection Using a Boosted Cascade of Simple Features", Viola et al., CVPR 2001.

Condensation—Conditional Density Propagation for Visual Tracking http://www.robots.ox.ac.uk/~ab/abstracts/ijcv98.html, Int. J. Computer Vision, 29(1):5-28, 1998.

"Recovery of Ego-Motion by Region Registration", Irani et al.

"A Robust Method for Computing Vehicle Ego-motion", Stein et al.

"Multiple Plane Segmentation Using Optical Flow", Zucchelli et al, 313-322, BMVC 2002.

* cited by examiner

SYSTEM AND METHOD FOR VEHICLE DETECTION AND TRACKING

CROSS REFERENCE TO RELATED APPLICATIONS

This application claims the benefit of U.S. Provisional Application Ser. No. 60/457,056 filed on Mar. 24, 2003 and U.S. Provisional Application No. 60/490,332 filed on Jul. 25, 2003 which are incorporated by reference in their entirety.

FIELD OF THE INVENTION

The present invention is directed to a monocular vision system and method for vehicle detection and tracking for the purpose of driver assistance, and more particularly, to a system and method for vehicle detection and tracking using component-based detectors with boosted discriminants.

BACKGROUND OF THE INVENTION

Machine-vision-based obstacle detection and tracking is an important component in autonomous vehicle systems. In a typical driving scene, the obstacles include vehicles, pedestrians and any other objects that are either moving or rising above the road plane. The purpose of obstacle detection is to separate moving objects from the driving scene, the obstacles including vehicles, pedestrians and any other objects that are either moving or rising above the road plane. Such information is required by a number of automotive applications, e.g., adaptive cruise control, forward collision avoidance and lane departure warning. By fusing the results of detecting and tracking individual objects, it is possible to achieve sufficient perception of the driving environment.

A number of approaches have been developed to address vehicle tracking and detection. One category of obstacle detection methods uses motion analysis. The true motion vectors of the road plane resulting from camera motion are estimated from camera parameters, position and ego velocity. When an object is violating the planarity assumption, a significant difference between the optical flow vectors calculated from consecutive frames and the true motion vectors (i.e., motion parallax) is detected, which indicates the appearance of an obstacle that is either moving or rising above the road plane. Other approaches group the optical flow vectors into clusters and track with a Kalman filter. With a calibrated camera and estimate of ego-motion, one approach can detect and distinguish between moving objects and stationary but elevated objects. In yet another approach, the clusters of flow vectors are further grouped into parallel lines on the rear face of an enclosing box, which correspond to the rear bumper of moving vehicles on the road plane.

Ego-motion recovery is also used to track vehicle position. Planar motion models are used to describe the 2D image flow of road plane resulting from camera motion. Image measurements that violate the rigid motion assumption and structures above the road plane are considered outlier and excluded from ego-motion estimation. In yet another approach, the motion analysis is extended to automatically detect multiple planes from sparse optical flow information.

Obstacle detection methods using only motion information are sensitive to image noise and illumination changes. In addition, the detected obstacles cannot be classified by motion information alone.

In another approach, a 3D polyhedral model is used to detect and track vehicles in a surveillance setup. A vehicle is described in a 2D view sketch composed of edge segments specified by their length parameters. This approach requires previous knowledge of ego-motion and camera calibration. When the camera parameters and ego-vehicle velocity are not available, motion analysis is no longer sufficient for vehicle detection because there is no way of knowing the true image flow describing the road plane.

In another known approach, distant cars are detected and validated through horizontal and vertical edge detection, aspect ratio check and template correlation. If camera parameters are available, the distance of the detected cars from ego-vehicle can be estimated through the perspective projection model. In some instances, the detection starts from feature selection and tracking. Tracked features are grouped into clusters corresponding roughly to different objects in the scene. Vehicles are identified and validated through edge finding. A simple vehicle classification scheme is introduced based on the aspect ratio to distinguish cars, SUVs, pickups and trucks. In other approaches, a probabilistic model is introduced to model the strength of the edges around the vehicle boundary. Vehicle detection is implemented by locating bounding boxes from edges and verifying the vehicle presence with the edge model. The extended Kalman filter is used to track the detected vehicle.

A second category of vehicle detection algorithms treats the detection as a two-class pattern classification problem involving the vehicle class and the non-vehicle class. Instead of using the empirical descriptions for the vehicle class, these algorithms use a classification function to tell if an image patch contains a vehicle or not. Through an offline training process, the best classification function with minimum classification error is learned from a number of vehicle and non-vehicle examples. The training process takes into account the variation of vehicle appearance within the training examples. Compared to the empirical vehicle model with edges, shapes and templates, the training and classification approach produces more reliable detection results.

In one approach, a vehicle detection algorithm is implemented in two steps: multi-scale driven hypothesis generation and appearance-based hypothesis verification. Appearance-based hypothesis verification verifies the hypothesis using wavelet feature extraction approach and Support Vector Machines (SVMs) as classifiers. In another approach, a Support Vector Tracking (SVT) method is introduced, which integrates the SVM classifier into an optical-flow based tracker. Instead of minimizing an intensity difference function between consecutive frames, SVT maximizes the SVM score such that the detection results have the highest confidence scores in the corresponding video frames.

In these approaches, the classifier response is computed over a neighborhood region around the vehicle position detected from the previous frame. The location with the highest response is considered the vehicle position in the current frame. The focus of such detection methods is to build an accurate and efficient vehicle detector (classifier). Tracking is considered a process of data association that links the detection results from individual frames to a temporal trajectory.

Even though all of these different approaches exist, there is a need for a method for detecting and tracking vehicles that has high performance and low complexity. Since the calculations required for vehicle detection and tracking must be made in real time, complex calculations are not feasible. Yet, in order to acceptably track a vehicle, the accuracy of the detection method must be high.

SUMMARY OF THE INVENTION

A system and method for detecting and tracking objects is disclosed. A camera captures a video sequence comprised of a plurality of image frames. A processor receives the video sequence and analyzes each image frame to determine if one or multiple objects are present. The processor applies one or more component classifiers to sub-regions in each image frame and computes confidence scores based on the application of the one or more component classifiers to the sub-regions. A database stores the one or more component classifiers. A display displays the video sequence. The one or more component classifiers are trained separately offline using training images of objects components and non-objects images.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a system and method for appearance trajectory-based vehicle detection and tracking. Initially, the detection process takes place over a number of video frames to identify the presence of one or multiple vehicles in the scene. Once the hypothesis of a vehicle presence is validated with sufficient confidence, tracking takes over to follow the vehicle throughout subsequent frames. It is to be understood by those skilled in the art that the present invention can also be used to detect and track other objects such as, but not limited to, pedestrians, bicycles, motorbikes, traffic signs or other objects which may be found in a street environment. For purposes of explanation, the present invention will be described in the context of vehicle detection and tracking.

Unlike the vehicle detection in a still image, in an automotive vision system, vehicles in front of the ego-vehicle appear in multiple frames. The information of vehicle appearance and vehicle motion should work in a collaborative way to ensure robust and reliable detection and tracking. Motion information has the ability of associating vehicle appearances along the temporal axis. With temporal data association, the detection becomes more robust against the sudden degradation of vehicle appearance in an isolated frame. On the other hand, a well-trained vehicle detector helps to verify the tracking results with a confidence score.

Figure 1:
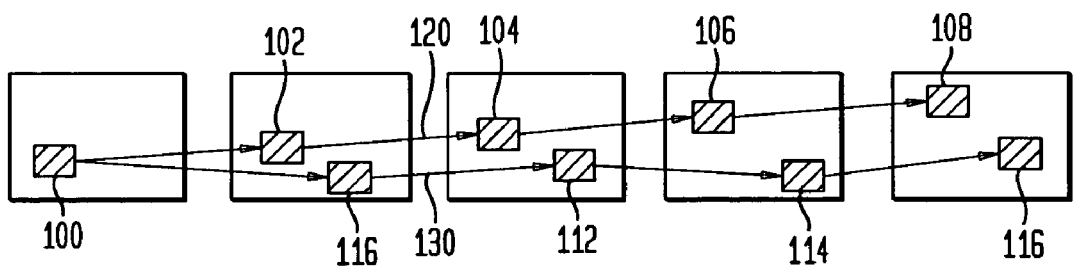
FIG. 1 is a schematic diagram illustrating vehicle detection over image sequences to detect temporal trajectories of vehicle appearances in accordance with the present invention.

In contrast to vehicle detection in still images, vehicle detection over image sequences detects temporal trajectories of vehicle appearances. Appearance trajectory is used to describe object appearances in multiple frames. Let $(A_t, x_t)$ denote the appearance and its position in frame t. An appearance trajectory over frames 1 to t is defined by $\{A_i, x_i\}_{i=1}^{t}$. There are many appearance trajectories in an image sequence. FIG. 1 illustrates vehicle 100 and two possible trajectories 120, 130 as shown in a series of image frames. The first trajectory 120 shows the position of the vehicle 100 at 102, 104, 106 and 108 for each successive frame. The second trajectory 130 shows the position of the vehicle 100 at 110, 112, 114 and 116 for each successive frame.

In general, the majority of the trajectories in an image sequence are not from vehicles. In fact, most of them are invalid in the sense that the temporal association is incorrect. The task of detection is to find the appearance trajectories that are caused by vehicles. This is an integrated detection problem in an extended domain A×M, where A is the collection of appearances $\{A_1, \ldots A_t\}$ and M is the collection of trajectories $\{x_1, \ldots, x_t\}$.

Various classifiers can be adopted as the vehicle detector. In the following example a Bayesian detector is derived. Using p and q to denote respectively the Probability Density Functions (PDFs) of the vehicle class and the non-vehicle class, the Bayesian detector is expressed as a likelihood test between two density functions, $$L_t(z_{1:t}, A_{1:t}, x_{1:t}) = \frac{p(z_t, \cdots, z_1 | A_t, x_t, \cdots, A_1, x_1)}{q(z_t, \cdots, z_1 | A_t, x_t, \cdots, A_1, x_1)} \begin{cases} \geq \tau & \text{vehicle} \\ < \tau & \text{non-vehicle} \end{cases} \quad (1)$$

where $\tau$ is a threshold, $\{z_1, \ldots, z_t\}$ are measurements, i.e. the sequence of images, and $\{A_t, x_t, \ldots, A_1, x_1\}$ are state variables. The result is that a dynamic system is obtained. Using the Bayesian rule and assuming the first-order Markov, property, i.e. given the state variables of the frame t−1, $\{A_t, x_t\}$ are independent of the state variables of the frames before t−1:

$$p(z_t, \ldots, z_1 | A_t, x_t, \ldots, A_1, x_1) = \kappa \cdot p(z_{t-1}, \ldots, z_1 | A_{t-1}, x_{t-1}, \ldots, A_1, x_1) \cdot p(z_t | A_t, x_t) \cdot p(A_t, x_t | A_{t-1}, x_{t-1}) \quad (2)$$

The Bayesian detector is written as $$L_t(z_{1:t}, A_{1:t}, x_{1:t}) = L_{t-1}(z_{1:t-1}, A_{1:t-1}, x_{1:t-1}) \cdot \quad (3)$$

$$\frac{p(z_t | A_t, x_t)}{q(z_t | A_t, x_t)} \cdot \frac{p(A_t, x_t | A_{t-1}, x_{t-1})}{q(A_t, x_t | A_{t-1}, x_{t-1})}$$

$p(z_t|A_t,x_t)$ describes the appearance model. $p(A_t,x_t|A_{t-1},x_{t-1})$ describes the motion model. The two models are integrated into the trajectory detector (2). Consider the following configuration: $x_t$ represents the location of the appearance in frame t, $A_t$ represents the pose and scale (size) of the appearance, then $$\frac{p(z_t | A_t, x_t)}{q(z_t | A_t, x_t)}$$

is the response of the likelihood detector for the particular scale and pose indicated by $A_t$ at location $x_t$ in frame t. $p(A_t, x_t|A_{t-1},x_{t-1})$ describes the (pose, scale, location) changes over consecutive frames. A proper motion model should be adopted to impose the motion constraints in a driving scene. For example, when a vehicle moves away from the camera, the size of that vehicle in the image plane gets smaller. Similarly, when a vehicle moves from the left or right side of the ego-vehicle to the front, a view change of that vehicle from side view to rear view is observed.

The relation in (2) indicates that the appearance trajectory can be detected in a sequential manner. An initial likelihood test $L_t$ is used to detect the vehicle candidates in frame 1. As more image frames are captured, the likelihood accumulates over time. At time t, $L_t$ gives an accumulated confidence score of how likely the trajectory under detection is caused by a vehicle. If this accumulated score is sufficiently high, the confidence level is high enough to claim that a vehicle appears in the sequences. If the accumulated score is sufficiently low, it is very likely that the current trajectory is not caused by a vehicle and can be safely discarded. If the scale of a vehicle appearance is too small, it means that the vehicle is too far away from the camera. Such a trajectory may also be dropped because the scale exceeds the range of robust detection.

The appearance detector can be implemented with local features representing various components of the vehicle, such as the corners and the horizontal and vertical boundaries. Additional parameters can be introduced into $A_t$ to represent the occlusion condition. When multiple trajectories are detected, their relative positions in frame t can be inferred from $\{A_t, x_t\}$. Thus, the occlusion condition can be inferred for each detected vehicle.

Once a vehicle is detected with high confidence, vehicle tracking is performed, by locating the vehicle in a local area around the vehicle position in the previous frame using the appearance detector. The confidences scores from previous frames are propagated to the current frame and an accumulated score is computed for the current frame.

Figure 2:
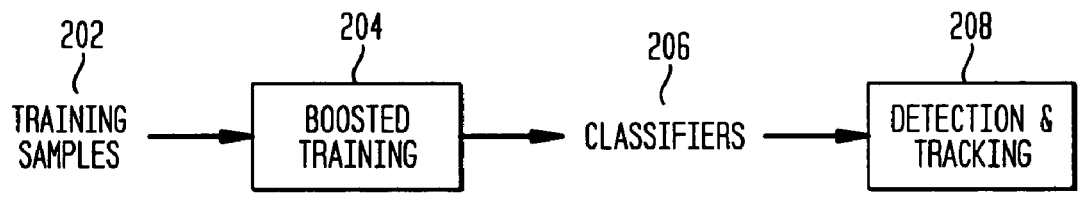
FIG. 2 is a high level functional block diagram of a system for training component classifiers (offline) and detecting and tracking vehicles (online) in accordance with the present invention.

In accordance with the present invention, detection and tracking are carried out on both frame-level and track level. On the frame level, trained classifiers are used to detect new vehicle appearance from individual frames. On the track level, vehicle trajectory is detected and tracked by accumulating detection results over multiple frames. FIG. 2 illustrates a high level block diagram of a system for training the appearance detector and performing vehicle detection and tracking in accordance with the present invention.

To train the classifiers, a plurality of samples (e.g., hundreds to thousands of samples) of vehicles are collected from video sequences and images containing vehicles in order to define training samples 202 for the vehicle class. An initial set of background image samples are also collected as the training samples for the non-vehicle class. A boosted training method 204 is used to learn initial classifiers 206 from these training samples 202. The classifiers are evaluated on a validation set. Misclassified samples in the validation set are put into training database to retrain the classifiers. This procedure is repeated for multiple rounds.

In accordance with the present invention, the boosted training method 204 identifies the features that best separate vehicle patterns from non-vehicle patterns. These features are chosen to define the classifiers 206. Features are designed to describe local structures of vehicle patterns, e.g. horizontal, vertical edges and corners, across various spatial location and scales. A number of discriminant features and decision rules are selected by a training algorithm so that a cost function evaluated on the training data is minimized. Different classifiers are trained for different components and different scales. A separate classifier is trained for the entire vehicle appearance using vehicle samples aligned according to the component positioning and non-vehicle samples. Classifiers 206 learned in training are used to detect vehicles in each video frame. Given an image patch, the chosen features are computed from the image. Based on the feature values, the classifier outputs a confidence score that indicates the confidence in the pattern being a vehicle. By accumulating the confidence over multiple frames, track-level vehicle detection is achieved.

Figure 3:
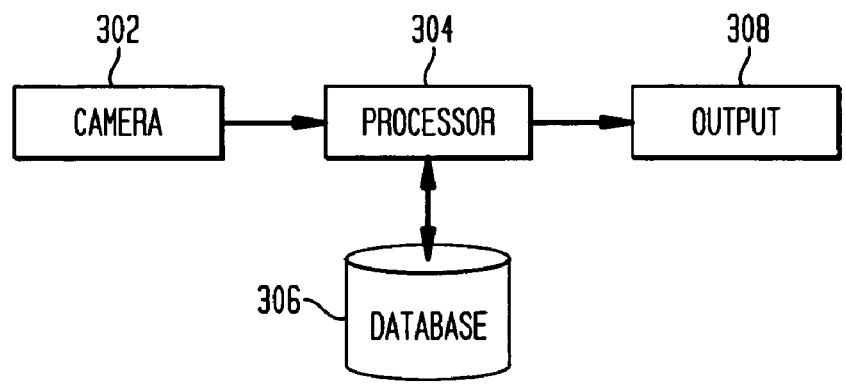
FIG. 3 is a system block diagram of a system for detecting and tracking vehicles in accordance with the present invention.

FIG. 3 illustrates a block diagram of a system for implementing the present invention. A camera 302 is used to capture images of a road and its surroundings. As would be expected with a typical road image, the image includes background images, such as buildings, trees, and houses, and vehicles driving on the road. The images are communicated to a processor 304 which computes confidence scores using the component classifiers in a database 306. The images are analyzed in accordance with the present invention to identify potential vehicles. Once a vehicle is identified at a sufficient confidence level, the vehicle is identified via an output device 308. The output device 308 provides an output signal which communicates to the user the presence of one or more vehicles. The output signal may be an audible signal or other type of warning signal. The output device 308 may also include a display for viewing the detected vehicles. The display provides a view of the images taken by the camera 302 which are then enhanced to indicate vehicles that have been detected and which are being tracked.

Figure 4:
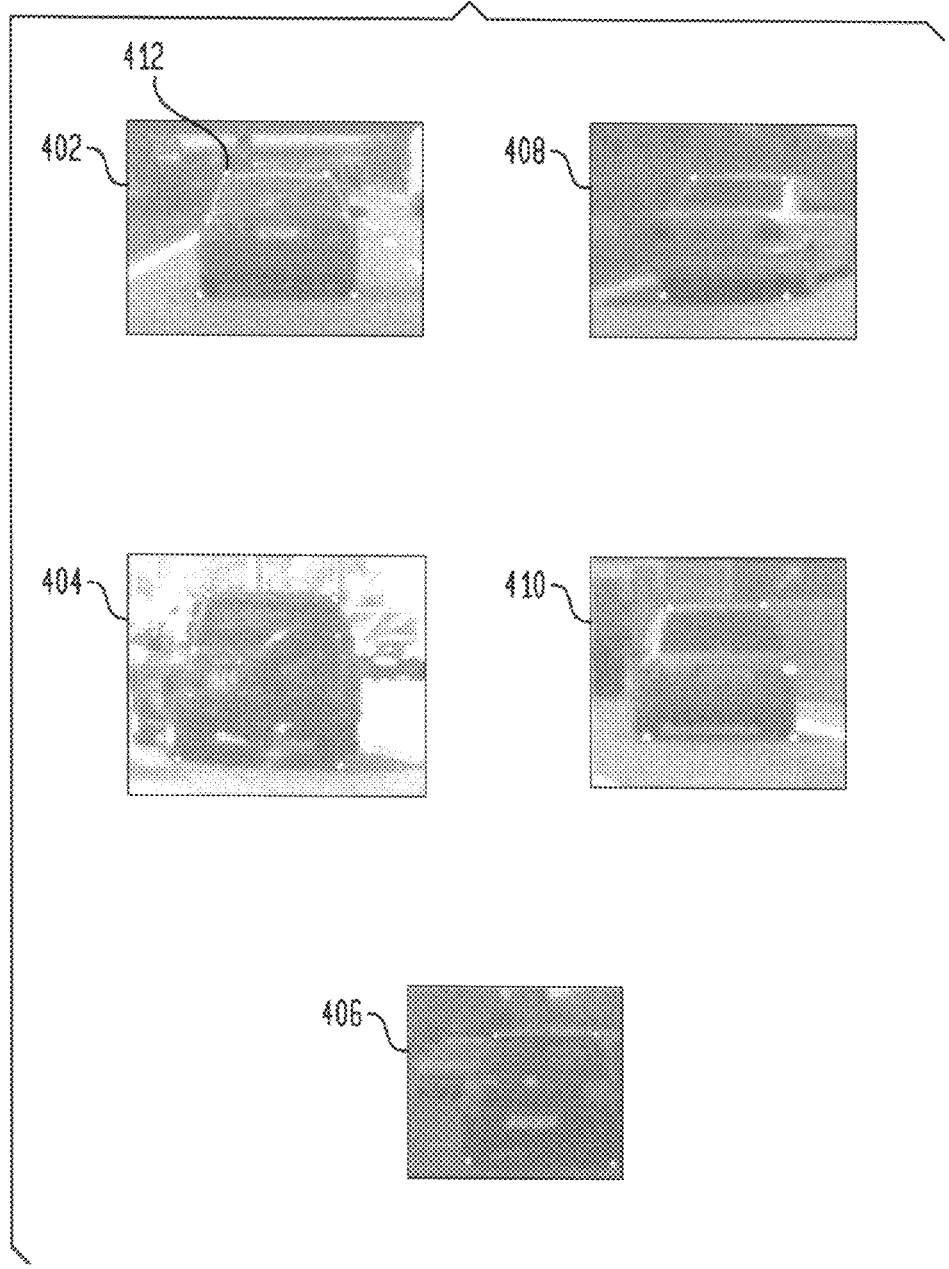
FIG. 4 illustrates images of vehicles with alignment points used to train component classifiers that can be detected in accordance with the present invention.

FIG. 4 illustrates images of samples of various types of vehicles which may be detected by the method of the present invention. As is well known, there are numerous types and styles of vehicles, each type having their own shape and outstanding characteristics. Even vehicles that may be classified in the same class have different characteristics. FIG. 4 illustrates two such classes of vehicles, sedans 402, 404 and 406, and sport utility vehicles 406 and 408. One characteristic which is used to detect vehicles and which will be described in greater detail hereinafter is the corners of the vehicles. Each vehicle has an upper and lower right corner and an upper and lower left corner. Each vehicle image shows the corners as a dark dot as exemplified by the top left corner 412 of vehicle 402.

Figure 5:
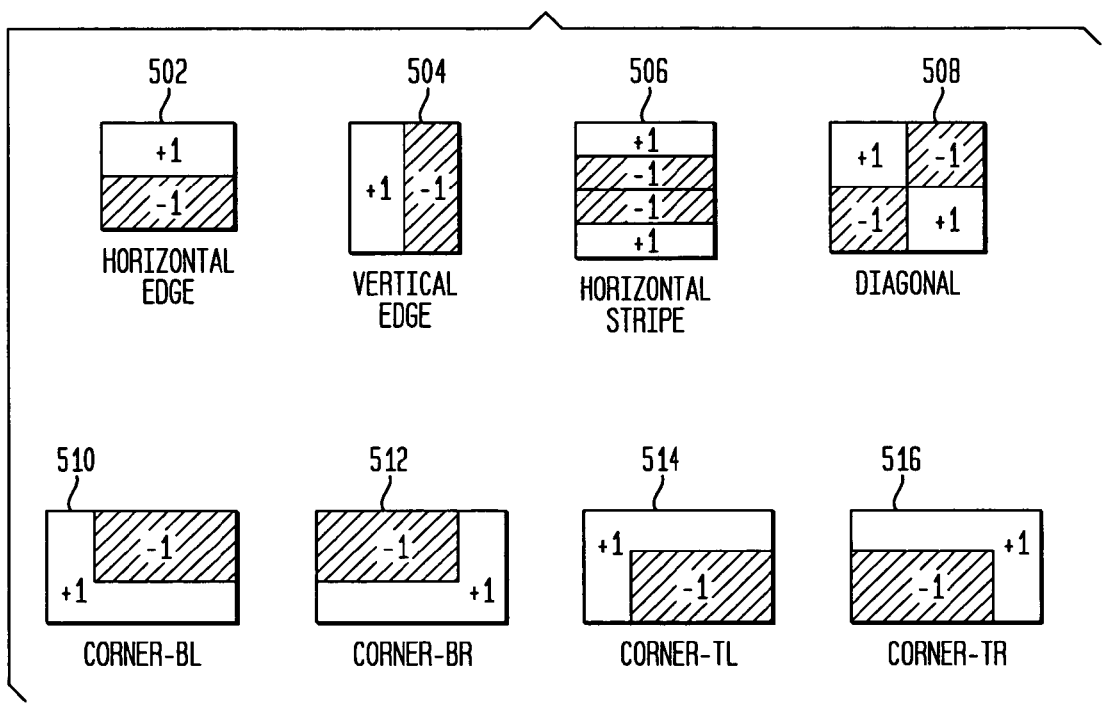
FIG. 5 illustrates examples of discriminant features that are used to define the component classifiers in accordance with the present invention.

In vehicle detection, a strong classifier is defined by a number of weak classifiers and each weak classifier is derived from a feature. There are a variety of features designed for vehicles. Some examples of vehicle features are shown in FIG. 5. As illustrated in FIG. 5, many of the features pertain to the physical structure of the car. As shown, these features include horizontal edge 502, vertical edge 504, horizontal stripe 506, diagonal 508, bottom left corner 510, bottom right corner 512, top left corner 514 and top right corner 516.

Figure 6:
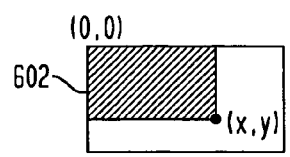
FIG. 6 illustrates an example of an integral image in accordance with the present invention.

To efficiently compute these features, integral images are implemented. An example of an integral image 602 is illustrated in FIG. 6. The integral value at the (x,y) of the integral image 602 is defined as the sum of all pixel values of the upper left rectangle (0,0)→(x,y). Using the integral image 602, it is very efficient to evaluate the area of any rectangular shape. The integral image 602 can also be evaluated for squared pixel values, which are used in computing the local variance.

Figure 7:
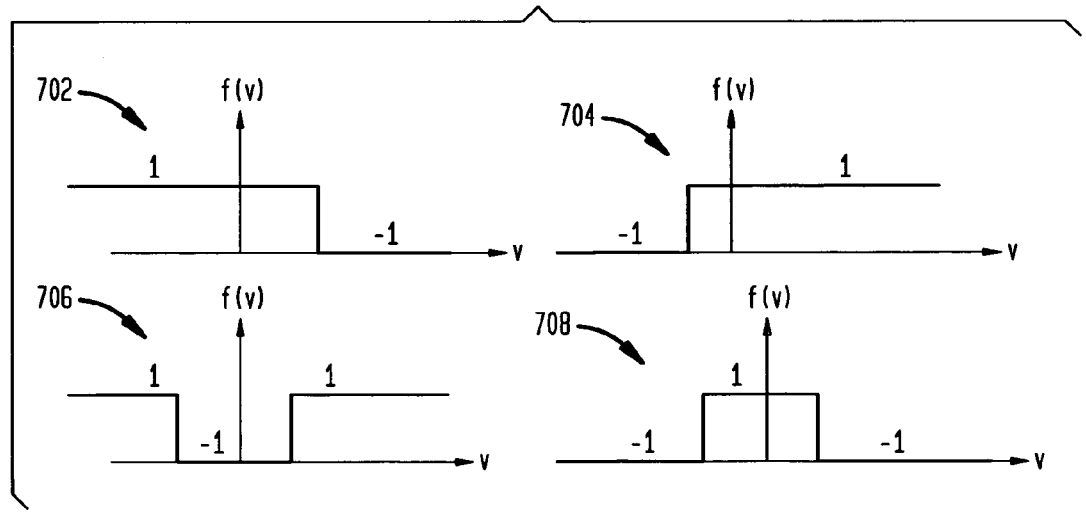
FIG. 7 illustrates decision functions used to define component classifiers in accordance with the present invention.

Given an image pattern I, a number of features $v_1(I), \ldots, v_n(I)$ are extracted from I. Each feature $v_i$ defines a weak classifier $f_i(v_i)$. There are four types of decision functions $f$ 702, 704, 706 and 708: step function pulse function with different thresholds and parities as illustrated in FIG. 7.

The decision from the strong classifier f is defined by the weighted sum of the decisions from weak classifiers:

$$f = \sum_i \bar{\alpha}_i \cdot f_i(v_i)$$

The weights used in detection are normalized weights:

$$\bar{\alpha}_i = \frac{\alpha_i}{\sum_i \alpha_i}.$$

Features with a large weight contribute more to the final decision. A set of feature set with best performance were decided from training. The size, location, decision function $f_i$ and the weight $\alpha_i$ are automatically decided in the boosted training.

Due to change of views and the variety of vehicle designs, severe pattern variation exists in vehicle appearance. For instance, the appearance of compact cars, trucks and utility vans looks very different from each other. For an object class with large variation, very few features can be effective for all the different appearances in terms of correct classification. A common approach to deal with complicated appearance class is to design separate classifiers for different subclasses. Nevertheless, the computational complexity would multiply. For efficient and accurate detection, an online adaptation strategy is used to cover large variations by a single classifier.

The key idea of online adaptation is to adapt the classifier structure to the online pattern. A dynamic switching strategy is used to direct the detector to take appropriate weak classifiers as discriminants according to auxiliary information about the online pattern. Thus, different classifier structures may be used in detecting different appearances inside the object class.

Figure 8:
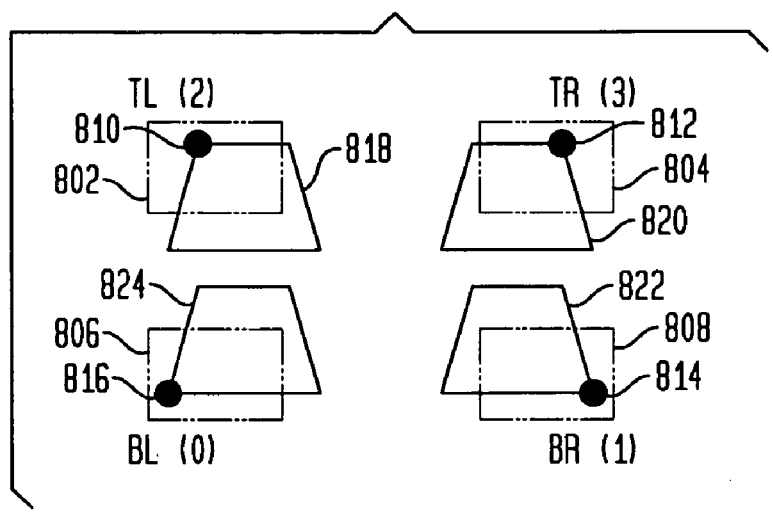
FIG. 8 illustrates exemplary components that are used to detect a vehicle in accordance with the present invention.

To cope with the variations in vehicle geometry, component based object detection is adopted in the algorithm to reduce the effect of misalignment. To detect a vehicle, four overlapping component classifiers are employed to detect the bottom-left (BL), bottom-right (BR), top-left (TL) and top-right (TR) corners 810, 812, 814 and 816 respectively as illustrated in FIG. 8. These components are overlapping and include a small portion of background regions 802, 804, 806 and 808. Certain geometric constraints are imposed between components. For example, given vehicle size, the height of the object and the distance between the top/bottom two corners are constrained. Each component classifier is defined by a series of features and decision functions, which are learned through training to detect the corresponding corner. The confidence scores from component detection will define a final confidence score for the vehicle appearance. Separate sets of component classifiers are learned through boosted training for a number of different vehicle sizes.

Figure 9:
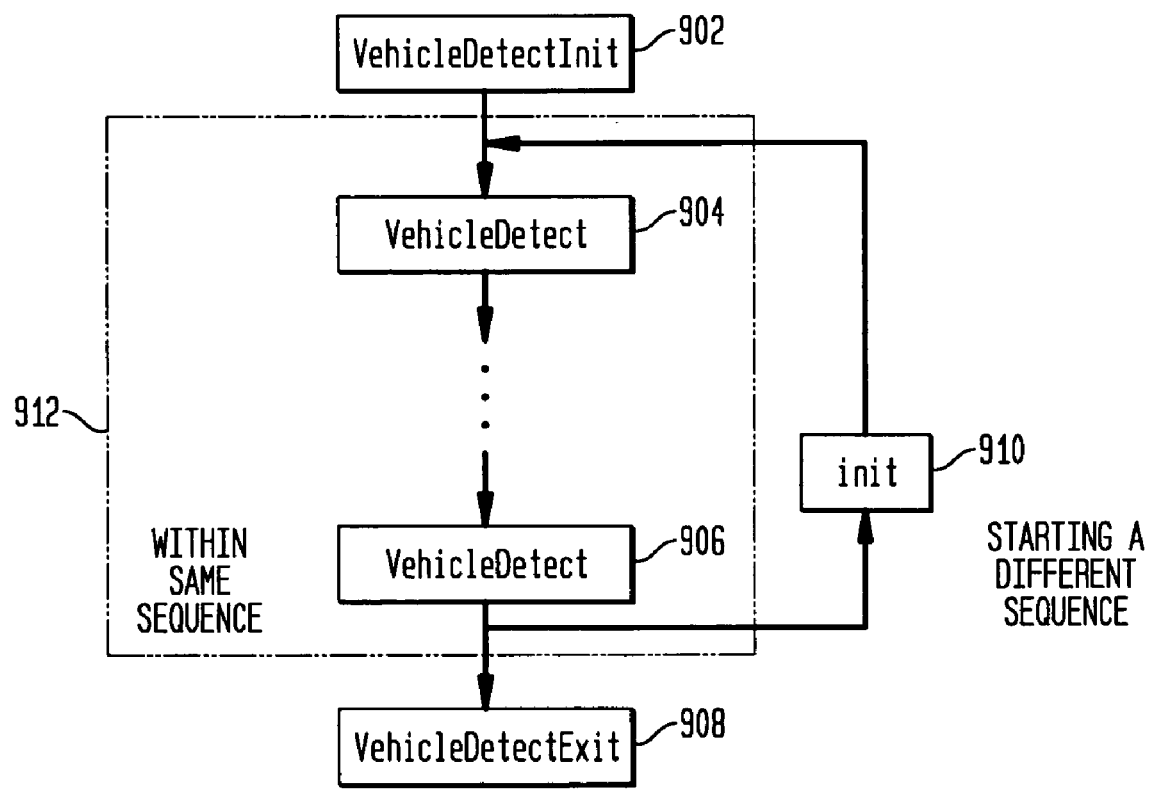
FIG. 9 illustrates a flow diagram depicting how video sequences are processed in accordance with the present invention.

FIG. 9 illustrates a method for processing vehicle video sequences in accordance with the present invention. A VehicleDetectInit module 902 is called in the beginning to initialize data members, load classifiers and allocate the memory for processing data. VehicleDetect modules 904 and 906 are called repeatedly to process a sequence of image frames. A VehicleDetectExit module 908 is called before exiting the class to release the memory. The VehicleDetectInit module 902, VehicleDetect modules 904 and 906 and VehicleDetectExit module 908 is executed for each video sequence for which vehicle detection is performed. If a different video sequence needs to be processed, an init module 910 is called to check whether the currently available memory is sufficient for processing the new sequence and reallocate memory if necessary.

Figure 10:
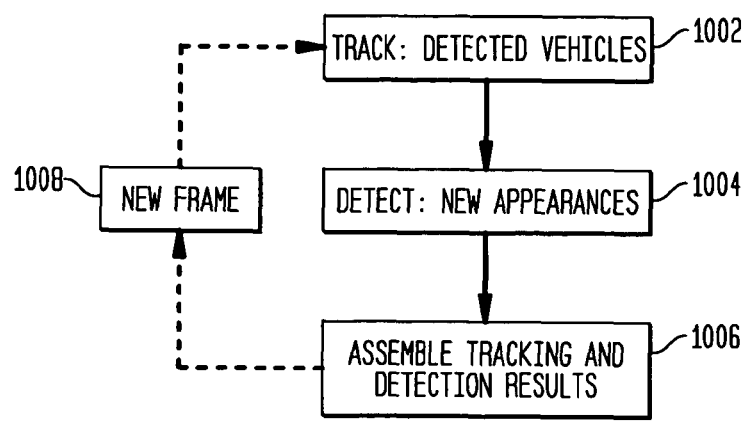
FIG. 10 illustrates a flow diagram depicting how an image frame is processed in accordance with the present invention.

The VehicleDetect modules 904 and 906 comprise the main function where each image frame is processed through three steps: tracking ("track") 1002, detection ("detect") 1004 and assembling results ("assemble") 1006 as illustrated in FIG. 10. These steps are performed on each new image frame 1008.

Knowing camera parameters, i.e. pitch, roll, yaw angles, camera location regarding the road plane as well as internal camera parameters, it is possible to determine the correspondence between the size of object appearance and the location of the object in the image field through 3D homogeneous coordinate transform and projective geometry. In other words, vehicle appearance with certain size can only appear in a limited area of the image. Thus, a valid detection area is defined for each classifier scale.

Since the computation is too intense if detection is performed in all scales for every frame, a scheme of alternate scanning along the scale dimension is adopted. For each frame, detection is performed in only one scale, and the detection scale alternates among all available scales. For instance, in the current implementation, the classifiers are trained at three scales: 32, 40, 50, and the detection is carried out in the following manner: in frame 1, vehicles of size around 32 are detected; in frame 2, vehicles of size around 40 are detected; in frame 3, vehicles of size around 50 are detection; and so on. To detect vehicle appearances that are larger than the classifier scales, we perform the same detection in reduced resolution image. For instance, in embodiment of the present invention, classifiers with three different scales are applied to three different resolution scales, leading to effective scale coverage as 32, 40, 50, 32×2, 40×2, 50×2, 32×4, 40×4, 50×4.

Referring back to FIG. 10, the purpose of tracking a detected vehicle 1002 is to maintain a degree of temporal consistency of the detection through consecutive frames. If an object has been detected in the previous frame, we will use the previous location and scale to restrict the search area for this object in the current frame, knowing that the change in location and scale over one frame period is very small. For example, if a vehicle is detected at location ($BL_{t-1}, BR_{t-1}$, $TL_{t-1}, TR_{t-1}$) in frame t-1, and the component classifiers of scale $s_{t-1}=40$ give the highest combined confidence, then the areas around $BL_{t-1}, BR_{t-1}, TL_{t-1}, TR_{t-1}$ in frame t are searched to find $BL_t, BR_t, TL_t, TR_t$ respectively using classifiers of scale $s_t=40$ as well as the classifiers of two neighboring scales $s_t=32$, $s_t=50$. The best location and scale are determined by the highest combined confidence. The search starts from a principal component. The principal component is defined as either the bottom-left corner or the bottom-right corner, depending on which corner produced higher confidence in the previous frame. Heuristically, the data measurement is more reliable around the principal component (e.g. free of occlusion) because it produced a higher confidence score. Once the best location is identified for the principal component, the remaining bottom corner as well as the top two corners are searched under geometric constraints. The search is also performed among scales. The vehicle detection method is based on the detection of N components. The most important example is the detection of the four corners. But it could also be a combination of M of the N components, as long as the detection rate of confidence of the M components is high enough. To detect occluded vehicles, not all components are required to be detected. A proper combination of less than four corners identified in the lower or upper part of a vehicle would suffice. The finial confidence is obtained by the sum of confidence produced by component classifier as well as the classifier for the whole appearance. The confidence is accumulated over frames:

$$\text{confidence\_accumulated}(t) = \text{confidence}(t) * \alpha + \text{confident\_accumlated}(t-1) * (1-\alpha)$$

Figure 11:
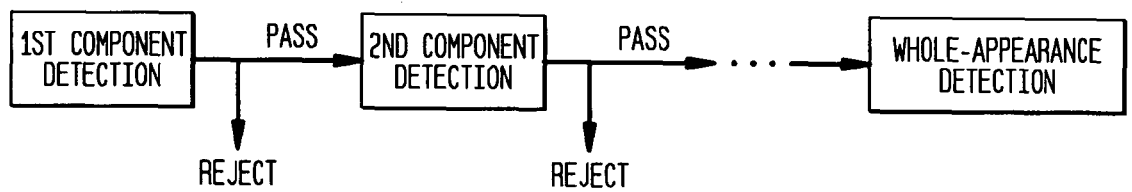
FIG. 11 illustrates a block diagram that depicts the cascade of component detection in accordance with the present invention.

The purpose of detection 1004 is to detect new appearances that are different than those established tracks. Scale alternate scanning is adopted to cover multiple scales. Referring to FIG. 11, a cascade detection scheme is adopted to detect multiple components. The idea of cascade detection is to start with one component, and continue to detect other components only when previous component detection produces high confidence. The starting component is called principal component in the algorithm, which alternates between bottom-left and bottom-right corners. The reason we start with the bottom corners is that the pattern variation around bottom corners is much less than that around the top corners. Consequently, bottom corner detection is more reliable than top corner detection.

Principal component detection is performed in the following way: at every spatial location, a confidence response is computed through component detection. The corresponding component classifier is used to evaluate the response. Thus, a complete response map is obtained for the principal component. Values in the response map indicate the confidence that a principal component appears at the corresponding locations. Local maxima of the response map with confidence values above a threshold are considered potential candidates for the principal components. Next, we continue to detect the remaining components for the accepted local maxima. If all detected components produce sufficiently high confidence, and they satisfy the geometric constraints, a whole-appearance detector is applied to further verify the candidate. The whole-appearance detector identifies the entire appearance of non-occluded vehicles or partial appearance such as the lower part or upper part of occluded vehicles. The final confidence is defined as the weighted sum of confidence from component detectors and the whole-appearance detector.

Figure 12:
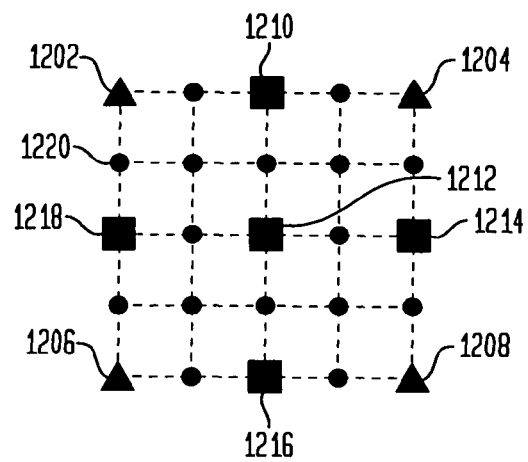
FIG. 12 illustrates a coarse to fine sampling lattice that is used to detect new appearances of an object in accordance with the present invention.
Figure 13A:
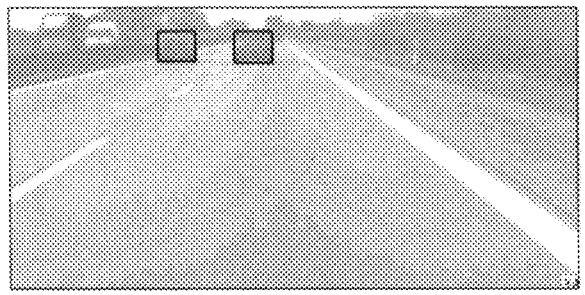
FIGS. 13a-d illustrate examples of vehicle tracking and detecting results found in accordance with the present invention.
Figure 13B:
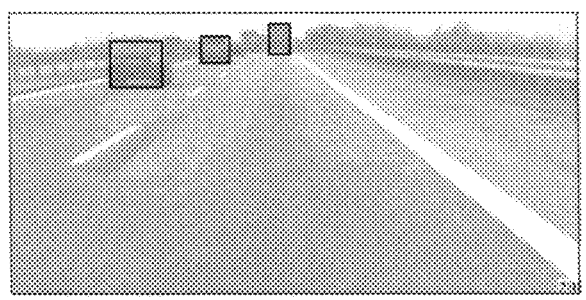
Figure 13C:
Figure 13D:
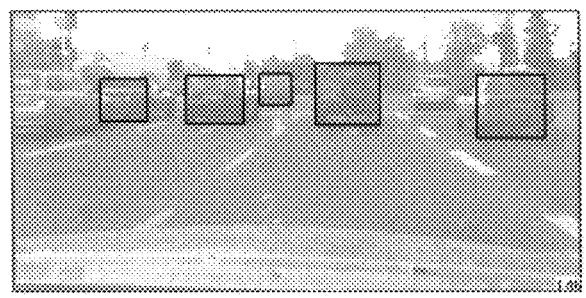

Most of the computation comes from generating response maps. To reduce computation, additional consideration is given to the response maps. First, due to the intensity changes around corners, the local areas tend to have a relatively high variance in intensity. Therefore, a low-cost variance check is performed at all spatial locations before computing response maps to rule out low variance areas. If the variance is very low, the local area is not considered as a candidate and the confidence is not computed. Second, response maps are computed through a coarse to fine sampling scheme as illustrated in FIG. 12. Response maps are first computed on a down-sampled image using a coarse lattice. As the sampling rate increases, response is computed only in the areas where high confidence is produced with a lower sampling rate. Hence, a full-resolution response map is computed only in high-confidence regions. As shown, the corners are indicated by triangles 1202, 1204, 1206 and 1208. Next, the mid-points of the frame and its center are indicated by squares 1210, 1212, 1214, 1216 and 1218. The rest of the points in the frame are indicated by a circle as exemplified by circle 1220.

As a final step, tracking and detection results are assembled 1006. Results from the same object are merged. This process is repeated for every object that is detected and determined to be a vehicle. FIGS. 13*a-d* illustrate examples of vehicles detected and tracked in accordance with the present invention. Each vehicle that is detected is identified by a rectangle. As described above, once a vehicle is detected, it is tracked by image frames.

In accordance with the present invention, a number of function keys are specified. Separate classifiers are trained for different components and different scales. It comprises a number of features and their associated decision functions. The classifier response is defined as a weighted sum of the decisions from individual features. All the classifiers are loaded from classifier files, which record the information of what and how many features are used, the type of decision functions as well as their weights.

Having described embodiments for a method for detecting and tracking vehicles, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for detecting one or more objects belonging to the same object class comprising the steps of:
   a) receiving a video sequence from a video camera comprised of a plurality of image frames;
   b) applying one or more component classifiers to detect components of objects in an image frame in the video sequence, wherein the component classifiers include classifiers for detecting object components of different sizes at multiple scales;
   c) computing a confidence score based in part on the response from the one or more component detectors;
   d) repeating steps b) and c) to detect components of objects belonging to the same object class in additional images frames in the video sequence; and
   e) accumulating confidence scores from the component detectors to determine if an object is detected,
   wherein said method is adapted for detecting moving and stationary objects from a moving video camera.

2. The method of claim 1 wherein if accumulated confidence scores indicate high confidence of a presence of an object, the method further comprising the step of:

identifying the detected components to be an object of a particular object class.

3. The method of claim 1 wherein the object class is a vehicle.

4. The method of claim 1 further comprising the step of:
if an object is detected, outputting a detection signal and object position.

5. The method of claim 1 further comprising the steps of:
testing geometry constraints on a spatial arrangement of detected components in an image; and
applying whole-appearance classifiers an image patch that contains the detected components and which is aligned according to the position of the detected components.

6. The method of claim 5 wherein the geometry constraints are derived from camera parameters.

7. The method of claim 5 wherein the geometry constraints are derived from object size.

8. The method of claim 5 wherein the geometry constraints are derived from a location of an object appearance in the image.

9. The method of claim 5 wherein the whole appearance classifiers detect entire or partial object appearance, the entire or partial object appearance being aligned according to positioning of at least two components.

10. The method of claim 1 wherein component classifiers are defined by discriminant features and decision rules which are learned through boosted training.

11. The method of claim 10 wherein the discriminant features include corners.

12. The method of claim 10 wherein the discriminant features include horizontal edges.

13. The method of claim 10 wherein the discriminant features include vertical edges.

14. The method of claim 10 wherein the discriminant features include horizontal stripes.

15. The method of claim 10 wherein the discriminant features include vertical stripes.

16. The method of claim 10 wherein the discriminant features include diagonal stripes.

17. The method of claim 10 further comprising the step of:
performing an online adaptation to adapt a classifier structure to an online pattern.

18. The method of claim 17 wherein the step of performing an online adaptation further comprises the step of:
applying a dynamic switching strategy to direct the detector to take appropriate weak classifiers as discriminants according to auxiliary information about the online pattern.

19. The method of claim 1 wherein the one or more classifiers include overlapping component classifiers.

20. The method of claim 19 wherein the overlapping component classifiers comprises four corners representing a rear profile of a vehicle.

21. The method of claim 19 wherein the overlapping component classifiers comprises four corners representing a frontal profile of a vehicle.

22. The method of claim 19 wherein the overlapping component classifiers comprises four corners representing a side profile of a vehicle.

23. The method of claim 20 wherein one of the overlapping component classifiers detects the bottom left corner of a vehicle.

24. The method of claim 20 wherein one of the overlapping component classifiers detects the bottom right corner of a vehicle.

25. The method of claim 20 wherein one of the overlapping component classifiers detects the top left corner of a vehicle.

26. The method of claim 20 wherein one of the overlapping component classifiers detects the top right corner of a vehicle.

27. The method of claim 20 wherein positioning of the four corners of the rear profile for a vehicle differ for different classes of vehicles.

28. The method of claim 27 wherein a class of vehicle includes sedans.

29. The method of claim 27 wherein a class of vehicle includes sports utility vehicles.

30. The method of claim 27 wherein a class of vehicle includes vans.

31. The method of claim 27 wherein a class of vehicle includes tractor trailers.

32. The method of claim 27 wherein a class of vehicle includes trucks.

33. The method of claim 20 wherein a distance between any two corners of the vehicle is constrained.

34. The method of claim 33 wherein the constraint between any two corners of the vehicle is scaled based on a distance between the vehicle and a camera capturing the video sequence and camera parameters.

35. The method of claim 1 wherein an image pyramid of multiple resolutions is used to detect objects of size 2*x, 4*x and so on with the classifier for the size x.

36. The method of claim 1 wherein the accumulated confidence scores are inferred from confidence scores across multiple frames using a recursive filter.

37. The method of claim 36 wherein when the accumulated confidence score is a linear combination of the confidence scores of multiple component classifiers and the whole-appearance classifiers.

38. The method of claim 37 wherein when the confidence score for a principal component classifier is sufficiently high, the confidence score of the remaining component classifiers and the whole-appearance classifier are computed.

39. The method of claim 2 wherein if an object is detected the method comprising the step of: tracking the object over subsequent image frames.

40. The method of claim 39 wherein the step of tracking the object further comprises the step of:
restricting an area of search in each subsequent image frame based on the location of the object in a current image frame.

41. The method of claim 39 wherein the step of tracking the object further comprises the step of:
determining the optimal classifier scale based on a distance between the object and a camera detecting the object and camera parameters.

42. The method of claim 1 wherein the confidence scores of component classifiers are computed in a coarse to fine framework.

43. The method of claim 1 wherein detection is performed on an image pyramid of multiple resolutions.

44. The method of claim 1 wherein an object class includes pedestrians.

45. The method of claim 1 wherein an object class includes bicycles.

46. The method of claim 1 wherein an object class includes motorcycles.

47. The method of claim 1 wherein object class includes different types of traffic signs.

48. A system for detection and tracking an object comprising:
a camera for capturing a video sequence comprised of a plurality of image frames;
a processor for receiving the video sequence and analyzing each image frame to determine if an object is detected, said processor applying one or more component classifiers to detect components of objects in each image frame and computing a confidence score based on the response from the one or more component detectors and the result of additional validation, wherein the accumulated confidence scores is inferred from confidence scores across multiple frames using a recursive filter; and a database for storing the one or more classifiers and object training samples, wherein said system is adapted for detecting moving and stationary objects from a moving video camera.

49. The method of claim 48 wherein the object class is a vehicle.

50. The method of claim 48 wherein the object class is a pedestrian.

51. The method of claim 48 wherein the object class is a bicycle.

52. The method of claim 48 wherein the object class is a motorbike.

53. The method of claim 48 wherein the object class includes different types of traffic signs.

54. The system of claim 48 wherein the detected components are determined to be an object of a particular object class if the confidence scores are high.

55. The system of claim 54 wherein if an object is detected, the processor outputs a warning signal.

56. The system of claim 48 further comprising: a display for displaying the video sequence.

57. The system of claim 48 wherein the processor further comprises:

means for testing geometry constraints on a spatial arrangement of detected components in an image; and means for applying whole-appearance classifiers an image patch that contains the detected components and which is aligned according to the position of the detected components.

58. The system of claim 57 wherein the geometry constraints are derived from camera parameters.

59. The system of claim 57 wherein the geometry constraints are derived from object size.

60. The system of claim 57 wherein the geometry constraints are derived from a location of an object appearance in the image.

61. The system of claim 57 wherein the whole appearance classifiers detect entire or partial object appearance, the entire or partial object appearance being aligned according to positioning of at least two components.

62. The system of claim 48 wherein the component classifiers include classifiers for detecting object components of different sizes at multiple scales.

63. The system of claim 48 wherein component classifiers are defined by discriminant features and decision rules which are learned through boosted training.

64. The system of claim 63 wherein the discriminant features include corners.

65. The system of claim 63 wherein the discriminant features include horizontal edges.

66. The system of claim 63 wherein the discriminant features include vertical edges.

67. The system of claim 63 wherein the discriminant features include horizontal stripes.

68. The system of claim 63 wherein the discriminant features include vertical stripes.

69. The system of claim 63 wherein the discriminant features include diagonal stripes.

70. The system of claim 63 further comprising the step of: performing an online adaptation to adapt a classifier structure to an online pattern.

71. The system of claim 70 wherein the step of performing an online adaptation further comprises the step of:

applying a dynamic switching strategy to direct the detector to take appropriate weak classifiers as discriminants according to auxiliary information about the online pattern.

72. The system of claim 48 wherein the one or more classifiers include overlapping component classifiers.

73. The system of claim 72 wherein the overlapping component classifiers comprises four corners representing a rear profile of a vehicle.

74. The system of claim 73 wherein one of the overlapping component classifiers detects the bottom left corner of a vehicle.

75. The system of claim 73 wherein one of the overlapping component classifiers detects the bottom right corner of a vehicle.

76. The system of claim 73 wherein one of the overlapping component classifiers detects the top left corner of a vehicle.

77. The system of claim 73 wherein one of the overlapping component classifiers detects the top right corner of a vehicle.

78. The system of claim 73 wherein positioning of the four corners of the rear profile for a vehicle differ for different classes of vehicles.

79. The system of claim 78 wherein a class of vehicle includes sedans.

80. The system of claim 78 wherein a class of vehicle includes sports utility vehicles.

81. The system of claim 78 wherein a class of vehicle includes vans.

82. The system of claim 78 wherein a class of vehicle includes tractor trailers.

83. The system of claim 73 wherein a distance between any two corners of the vehicle is constrained.

84. The system of claim 83 wherein the constraint between any two corners of the vehicle is scaled based on a distance between the vehicle and a camera capturing the video sequence as well as camera parameters.

85. The system of claim 84 wherein an image pyramid of multiple resolutions is used to detect objects of size 2*x, 4*x and so on with the classifier for the size x.

86. The system of claim 48 wherein when the accumulated confidence score is a linear combination of the confidence scores of multiple component classifiers and the whole-appearance classifiers.

87. The system of claim 48 wherein when the confidence score for a principal component classifier is sufficiently high, the confidence score of the remaining component classifiers and the whole-appearance classifier are computed.

88. The system of claim 48 wherein the processor comprises:

means for tracking a detected object over subsequent image frames.

89. The system of claim 88 wherein tracking means further comprises:

means for restricting an area of search in each subsequent image frame based on the location of the object in a current image frame.

90. The system of claim 88 wherein the tracking means further comprises:

means for determining the optimal classifier scale based on a distance between the object and a camera detecting the object and camera parameters.

91. The system of claim 48 wherein the confidence scores of component classifiers are computed in a coarse to fine framework.

92. The system of claim 48 wherein detection and tracking is performed on an image pyramid of multiple resolutions.

93. A method for detecting one or more objects belonging to the same object class comprising the steps of:
   a) receiving a video sequence from a video camera comprised of a plurality of image frames;
   b) applying one or more component classifiers to detect components of objects in an image frame in the video sequence, wherein the one or more component classifiers include overlapping component classifiers, and wherein component classifiers are defined by discriminant features and decision rules which are learned through boosting;
   c) computing a confidence score based in part on the response from the one or more component detectors;
   d) repeating steps b) and c) to detect components of objects belonging to the same object class in additional images frames in the video sequence; and
   e) accumulating confidence scores from the component detectors to determine if an object is detected,
   wherein said method is adapted for detecting moving and stationary objects from a moving video camera.

* * * * *